FREQUENCY SELECTIVE NEGATIVE FEEDBACK RECORDING CIRCUITRY

Filed Sept. 28, 1956

INVENTOR.
James J. Davidson
BY
H. L. Newton
ATTORNEY.

3,029,317
FREQUENCY SELECTIVE NEGATIVE FEEDBACK RECORDING CIRCUITRY

James J. Davidson, Audubon, N.J., assignor to Radio Corporation of America, a corporation of Delaware
Filed Sept. 28, 1956, Ser. No. 612,784
3 Claims. (Cl. 179—100.2)

This invention relates to audio frequency signal amplifiers for tape recorders, and has for an object to provide an improved audio frequency signal amplifier for the recording channel of a tape recorder having multiple-slope pre-emphasis characteristics for certain frequencies within the audio frequency spectrum.

In order to obtain a flat frequency response from a tape recorder play-back amplifier that utilizes the NARTB (National Association of Radio and Television Broadcasters) standard play-back characteristics, the recorded signal, at certain frequencies within the audio frequency spectrum, must be pre-emphasized during the recording process. This is required partly because the head and tape combination is relatively less efficient when recording and reproducing short wave lengths and partly since the NARTB standard playback characteristic is not flat with frequency. The recording curve must have a multiple slope pre-emphasis, that is, a pre-emphasis particularly of the higher frequencies that does not increase linearly with frequency because of the above mentioned deficiencies in the record head and tape. Such a multiple slope characteristic for an amplifier frequency response may be obtained by tuned circuits having a high Q. However, inductive circuit elements must generally be used to obtain a high Q and these elements are costly and difficult to manufacture.

In accordance with the invention, multiple slope pre-emphasis, of the high audio frequency components of an applied signal to be recorded, is provided by using frequency-selective negative feedback over two audio frequency amplifier stages in the recording amplifier. The feedback lowers the gain of the amplifier to the greatest extent at those frequencies where no pre-emphasis is required and less feedback is provided at those frequencies where pre-emphasis is needed. Furthermore, the feedback circuit uses only resistive and capacitive elements, and thus the required pre-emphasis may be provided without the use of inductive elements.

Figure 1:
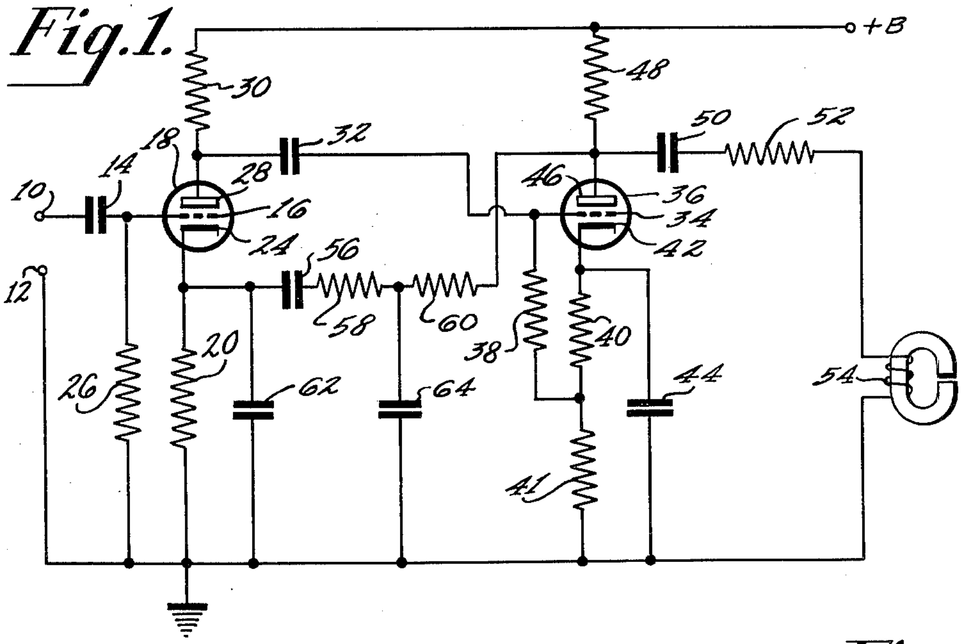
Figure 2:
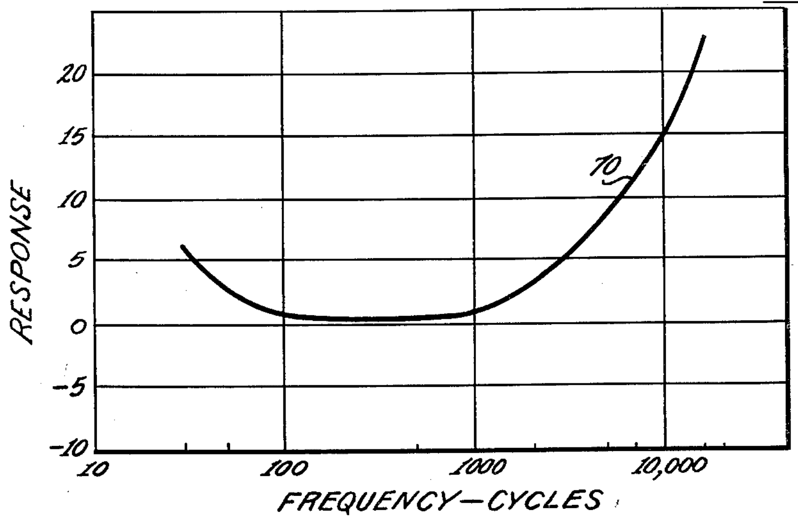

The invention may be further understood when the following description is read in connection with the accompanying drawing, in which;

FIGURE 1 is a schematic circuit diagram of a recording amplifier of a tape recorder illustrating an embodiment of the invention; and FIGURE 2 is a graph showing curves illustrating certain operational features of the circuit of FIGURE 1.

Referring now to FIGURE 1, audio frequency input signals, which may originate from a microphone, radio receiver or the like, are applied to a pair of signal input terminals 10 and 12. One terminal 12 is connected to ground or a point of reference potential for the amplifier, and the other terminal 10 is connected through a coupling capacitor 14 to the control grid 16 of a first audio frequency amplifier stage which includes an amplifier tube 18. A bias resistor 20 may be connected between the cathode 24 of the tube 18 and ground, and a grid return resistor 26 may be connected between the control grid 16 and ground. Operating potential is supplied to the tube 18 by connecting its anode 28 through an anode or output coupling resistor 30 to a source of positive operating potential, +B.

The audio frequency signal applied to the amplifier at the grid 16 of the first stage tube 18 is conveyed from the anode 28, through a coupling capacitor 32, to the control grid 34 of a second amplifier stage including an amplifier tube 36. Operating bias for the second tube 36 may be provided by cathode resistor means comprising a pair of bias resistors 40 and 41, with suitable bypass capacitor 44, in series between the cathode 42 of the tube 36 and ground. A grid return resistor 38 may be connected between the control grid 34 and the junction of the bias resistors 40 and 41 to apply a portion of the cathode bias potential to the grid. Operating potential is supplied to the tube 36 by connecting its anode 46 through an anode or output coupling resistor 48 to the source of operating potential, +B.

The amplified signal from the second stage tube 36 is applied to a record head 54 through an output circuit including a coupling capacitor 50 connected with the anode 46, and a series resistor 52 having a relatively large resistance, the action of which will be more fully explained hereinafter. The record head 54, as is well known, may comprise an inductive winding associated with a magnetic core having poles to provide a magnetic flux through the material of the recording medium, such as magnetic recording tape. Although the inductive winding of the record head 54 possesses both inductive and resistive impedance, the impedance of the winding is, however, essentially inductive and hence the record head 54 is indicated as having a purely inductive impedance.

In accordance with the invention, multiple slope pre-emphasis of certain frequencies within the audio frequency spectrum is provided in the amplifier of FIGURE 1, by providing negative feedback from the anode 46 of the second amplifier stage tube 36 to the cathode 24 of the first amplifier stage tube 18. The feedback is made frequency selective to vary the gain of the amplifier at different frequencies so that the proper recording pre-emphasis will be given to an applied audio frequency signal. In order for a recorded signal on a tape to be reproduced without appreciable distortion when it is reproduced by an amplifier having a playback characteristic according to the NARTB standards, the recorded signal on the tape must have the specified pre-emphasis hereinbefore discussed. A slight amount of pre-emphasis, about 4 to 5 decibels, is provided at low bass frequencies, for example at about 30 to 50 cycles per second (c.p.s.); the response at the middle audio frequencies, from about 50 c.p.s. to 1 kilocycle per second (kc.) should be essentially flat; at treble frequencies, about 1 kc. to 10 kc., the response begins rising at the rate of approximately 6 decibels per octave, the response being about 3 decibels up at 2 kc. from that at 1 kc.; and at the high treble frequencies, approximately 10 kc. and above, the slope becomes steeper, on the order of 12 decibels per octave, until the response at 15 kc. is approximately 20 decibels higher than the response at 1 kc. These requirements refer, of course, to the current through the record head 54 which supplies the signal to the tape.

The negative feedback circuit to provide these aforementioned pre-emphasis characteristics includes a series feedback capacitor 56 and first and second feedback resistors 58 and 60 connected in series, in the order named, between the cathode 24 of the first tube 18 and the anode 46 of the second tube 36. A first shunt feedback capacitor 62 is connected between the cathode 24 of the first tube 18 and ground, and a second shunt feedback capacitor 64 is connected between the junction of the first and second feedback resistors 58 and 60 and ground. The values of the feedback capacitors are chosen so that at the middle audio frequencies, the reactive impedance values of the first and second shunt feedback capacitors 62 and 64 is high with respect to the resistive impedance of feedback resistors 58 and 60 and the cathode bias resistor 20 of the first tube 18 and they may be considered open circuits; while the reactive impedance value of the series feedback capacitor 56 is such that it is small with respect to the resistive impedance values of the feedback resistors 58 and 60 and the cathode bias resistor 20. Therefore, at the middle audio frequencies, the feedback is determined by the voltage division between the feedback resistors 58 and 60 and the cathode bias resistor 20. The maximum feedback, and thus the minimum gain for the amplifier, is set by the resistive voltage division in the feedback network. This value of feedback may be selected as a base from which the pre-emphasis of the other frequencies may be measured.

At low bass frequencies, such as around 50 c.p.s., for example, the reactive impedance of the series feedback capacitor 56 becomes appreciable, causing a reduction in the amount of feedback voltage developed across the cathode bias resistor 20, and a consequent increase in gain at the low bass frequencies.

At treble frequencies, approximately 1 to 10 kc., the reactive impedance of the first shunt feedback capacitor 62 is selected to become appreciable. Thus at treble frequencies above 1 kc. the feedback will be reduced, since the impedance between the cathode 25 and ground will be decreasing as the impedance value of the first shunt feedback capacitor 62 decreases with increasing frequency, while the impedance between the cathode 24 of the first tube 18 and the anode 46 of the second tube 36 remains constant, since the feedback resistors 58 and 60 are not frequency selective. Since the network is essentially resistive and capacitive, the rate of decrease of feedback and rise in gain will be at the rate of 6 decibels per octave.

As the signal frequency increases into the high treble range above approximately 10 kc., the impedance value of the second shunt feed-back capacitor 64 is selected to become appreciable. The feedback will now be attenuated, first by the second feedback resistor 60 and the second shunt feedback capacitor 64 at the rate of 6 decibels per octave, as the frequency of the signal increases, and then the attenuated signal will again be attenuated by the first feedback resistor 58 and the second shunt feedback capacitor 62 at the rate of 6 decibels per octave. The total attenuation of the feedback will thus be 12 decibels per octave so that at high treble frequencies above approximately 10 kc. the increase in gain of the amplifier will be approximately 12 decibels per octave overall.

As has been seen, the signal voltage appearing at the anode 46 of the second amplifier tube 36 will have the proper response with respect to frequency to provide the required pre-emphasis. This voltage, however, must be converted to a corresponding current having the same frequency response characteristics through the record head 54. This is accomplished by connecting the record head 54 to the anode 46 through the relatively high value series resistor 52. The current through record head 54 will thus be determined by the total impedance of the record head 54 and the resistor 52 in series. Since the resistor 52 has a much higher impedance than the record head 54, the current through the series circuit is determined by the resistor 52 and the current will thus follow, with respect to frequency response, the amplitude of the voltage at the anode 46.

By way of example, an amplifier circuit constructed in accordance with the invention to provide the required multiple slope pre-emphasis characteristics had the following component values: First tube 18, one half of a type 12AU7; second tube 36, one half of a type 12AU7; capacitor 14, .047 microfarad; capacitor 32, .022 microfarad; capacitor 50, .1 microfarad; capacitor 44, 50 microfarads; capacitor 56, .022 microfarad; capacitor 62, .0082 microfarad; capacitor 64, 560 micro-microfarads; resistor 26, 1,000,000 ohms; resistor 20, 12,000 ohms; resistor 30, 220,000 ohms; resistor 38, 560,000 ohms; resistor 40, 820 ohms; resistor 41, 4,700 ohms; resistor 48, 22,000 ohms; resistor 52, 100,000 ohms; resistor 58, 22,000 ohms; resistor 60, 82,000 ohms.

In FIGURE 2, the response of the current through the record head 54 is plotted against the frequency of the applied audio frequency signal to be recorded. The curve 70 indicates that the circuit configuration and component values produce the desired type and amount of pre-emphasis needed to properly record the audio frequency signal on the tape.

A record amplifier for a tape recorder in accordance with the invention having the required pre-emphasis characteristics is characterized by its simplicity and economy in that no expensive inductive elements are required to provide the necessary pre-emphasis. The circuit may thus find wide application in the tape recording field.

What is claimed is:

1. An audio frequency signal amplifier for the recording channel of a tape recorder comprising in combination; first and second amplifier stages, means for applying an input audio-frequency signal to the first stage; means for deriving an amplified output signal voltage from the second stage, a record head for developing a magnetic field in accordance with flow of signal current therethrough and having substantially inductive impedance; resistive impedance means connected between said second stage and said record head for developing an output signal current corresponding to the signal voltage output of said second stage and applying said output signal current to said record head; and frequency selective negative feedback circuit means connected between said first and second stages and including shunt capacitive and series resistive circuit elements related in impedance values to provide negative feedback for reduced gain of said amplifier at the middle audio frequencies, a series capacitive circuit element for reduced negative feedback and increased gain at low bass frequencies, and further shunt capacitive and series resistive circuit elements for further reduced feedback and further increased gain above said middle audio frequencies initially at the rate of approximately six decibels per octave at treble frequencies and thereafter at the high treble frequencies at the rate of twelve decibels per octave.

2. In a tape recorder, a record amplifier for preemphasizing audio frequency signals of prescribed frequencies comprising in combination, first and second electron amplifier tubes, each having an anode, cathode, and a control grid, means for applying an input signal to the control grid of said first tube, bias resistance means connected between the cathode of said first tube and a point of reference potential for said amplifier, a record head having a substantially inductive impedance for developing a magnetic field responsive to signal current therethrough, means including a relatively high resistive impedance element for connecting said record head to the anode of said second tube, and frequency selective feedback circuit means including a first capacitor, a first resistor and a second resistor connected in series between the cathode of said first tube and the anode of said second tube, a second capacitor connected between the cathode of said first tube and the point of reference potential for said amplifier, and a third capacitor connected between the junction of said first and second resistors and the point of reference potential, the values of said capacitors and resistors being so related that the feedback is reduced to increase the gain of said amplifier slightly at the low bass signal frequencies and to increase the gain at treble signal frequencies at approximately six decibels per octave and to further increase the gain at high treble signal frequencies at approximately twelve decibels per octave.

3. In a tape recorder, a record amplifier for preemphasizing audio frequency signals of prescribed frequencies comprising in combination, a first and a second signal voltage amplifier stage including first and second electron amplifier tubes for said stages and each of said tubes having an anode, cathode, and a control grid, means for applying an input signal to the control grid of the first tube, a bias resistor connected between the cathode of the first tube and a point of reference potential for said amplifier, a record head having substantially inductive impedance for developing a magnetic field responsive to signal current therethrough, means providing a signal output circuit between said record head and the anode of said second tube, series resistive means interposed in said last named circuit for deriving a current therethrough having a frequency responsive characteristic corresponding to the signal voltage appearing at said anode, and frequency selective feedback circuit means connected between the anode of said second tube and the cathode of said first tube, said feedback circuit means including a first capacitor and first and second resistors connected in series in the order named between the cathode of said first tube and the anode of said second tube, a second capacitor connected between the cathode of said first tube and the point of reference potential for said amplifier, and a third capacitor connected between the junction of said first and second resistors and the point of reference potential, the values of said capacitors with respect to said bias resistor and said first and second resistors being such that the reactances of said second and third capacitors are large with respect to the resistances of said resistors and the reactance of said first capacitor is small with respect to the resistances of said resistors at the middle audio frequency signals, the reactance of said first capacitor being large relative to the resistances of said first and second resistors at low bass frequencies to reduce the amount of negative feedback, the reactance of said second capacitor being small relative to the resistance of said resistors at treble signal frequencies to reduce the amount of negative feedback, and said third capacitor being small in reactance value relative to the resistances of said resistors at high treble signal frequencies to further reduce the feedback, whereby the gain of said amplifier is increased slightly at the low bass frequencies and rises at treble frequencies at approximately six decibels per octave and further rises at high treble frequencies at approximately twelve decibels per octave.

References Cited in the file of this patent

UNITED STATES PATENTS

| | | |
|---|---|---|
| 2,237,407 | Bruck | Apr. 8, 1941 |
| 2,559,888 | Makepeace | July 10, 1951 |
| 2,658,958 | Wells | Nov. 10, 1953 |
| 2,740,850 | Massaut | Apr. 3, 1956 |

OTHER REFERENCES

War Dept. Technical Manual TM11-2548, released Oct. 18, 1946.